US009868486B2

(12) United States Patent
Hagimoto et al.

(10) Patent No.: US 9,868,486 B2
(45) Date of Patent: Jan. 16, 2018

(54) SADDLE-RIDE TYPE VEHICLE

(71) Applicant: HONDA MOTOR CO., LTD., Tokyo (JP)

(72) Inventors: Masashi Hagimoto, Wako (JP); Atsushi Kusuda, Wako (JP); Daisuke Nishiwaki, Wako (JP); Takayuki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 15/071,245

(22) Filed: Mar. 16, 2016

(65) Prior Publication Data
US 2016/0280059 A1    Sep. 29, 2016

(30) Foreign Application Priority Data

Mar. 26, 2015 (JP) .................................. 2015-065112

(51) Int. Cl.
| | |
|---|---|
| *B62J 17/02* | (2006.01) |
| *B60K 11/04* | (2006.01) |
| *B62J 17/00* | (2006.01) |
| *B62K 11/00* | (2006.01) |

(52) U.S. Cl.
CPC ............. *B62J 17/02* (2013.01); *B60K 11/04* (2013.01); *B62J 17/00* (2013.01); *B62K 11/00* (2013.01)

(58) Field of Classification Search
CPC .......... B60R 11/04; B62J 17/02; B60K 11/04
USPC ........................................................ 296/78.1
See application file for complete search history.

(56) References Cited

U.S. PATENT DOCUMENTS

| | | | | |
|---|---|---|---|---|
| 7,556,115 | B2 * | 7/2009 | Iwanaga | B62J 99/00 180/219 |
| 7,850,221 | B2 * | 12/2010 | Nakata | B62J 17/02 296/181.2 |
| 8,936,123 | B2 * | 1/2015 | Kogo | B60Q 1/0433 180/219 |
| 8,950,799 | B2 * | 2/2015 | Yokouchi | B62J 17/06 296/180.1 |
| 2003/0062740 | A1 * | 4/2003 | Takemura | B62J 17/04 296/78.1 |
| 2013/0320697 | A1 * | 12/2013 | Yokouchi | B62J 17/065 296/78.1 |
| 2017/0057583 | A1 * | 3/2017 | Yokoyama | B62K 5/027 |

FOREIGN PATENT DOCUMENTS

JP    2011-162062 A    8/2011

* cited by examiner

*Primary Examiner* — Jason S Morrow
(74) *Attorney, Agent, or Firm* — Westerman, Hattori, Daniels & Adrian

(57) ABSTRACT

A saddle-ride type vehicle in which left and right radiators are disposed on the sides of a vehicle body and the peripheries of these left and right radiators are covered by cover members to cause traveling air to pass through the left and right radiators from their inner sides to outer sides, the saddle-ride type vehicle including air introduction paths provided on the outer sides of the cover members and formed by the cover members and cowl members disposed outward of the cover members in the vehicle width direction.

10 Claims, 6 Drawing Sheets

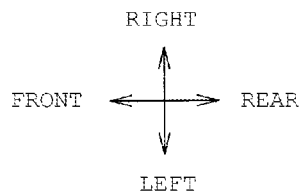
FIG. 5
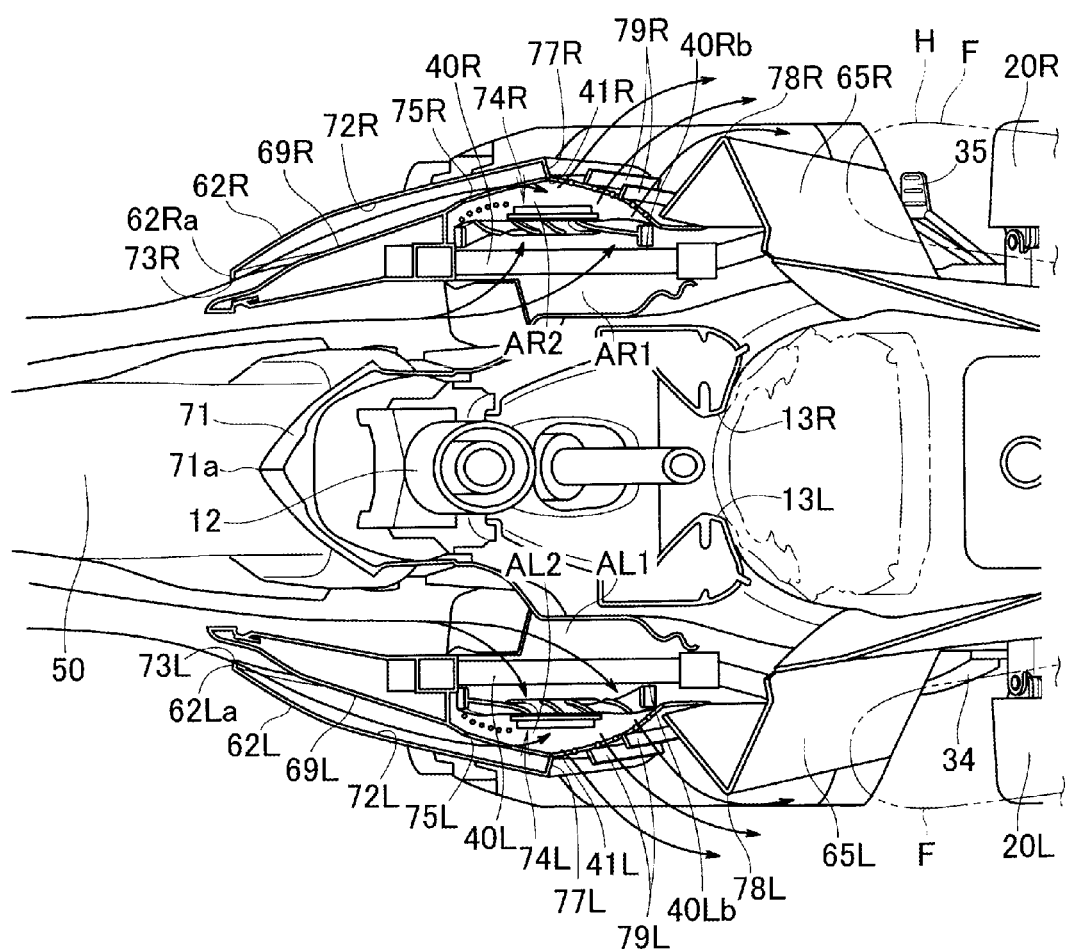

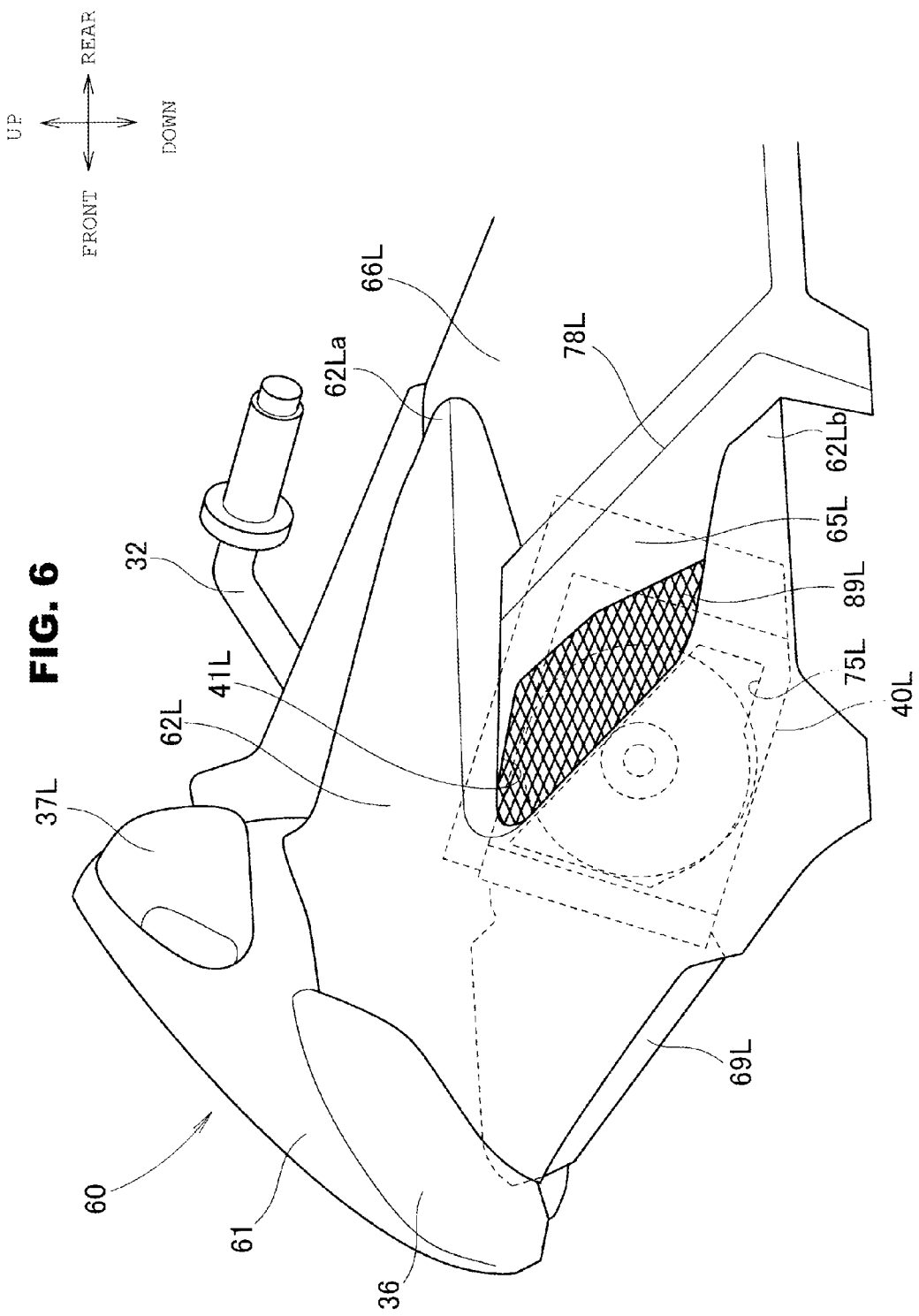

SADDLE-RIDE TYPE VEHICLE

TECHNICAL FIELD

The present disclosure relates to an improvement on a saddle-ride type vehicle including radiators at left and right sections of the vehicle body.

BACKGROUND

A saddle-ride type vehicle including radiators at left and right sections of the vehicle body for cooling the engine has been known (see FIG. 5 of Patent Document 1 ((Japanese Patent Application Publication No. 2011-162062)), for example).

As shown in FIG. 5 of Patent Document 1, left and right radiators (17, 17) (the numbers in parenthesis denote the corresponding reference numerals described in Patent Document 1, and the same applies below) are disposed to the sides of an engine (10) in the vehicle width direction. The left and right radiators (17, 17) are disposed such that their longitudinal directions are oriented along the vehicle front-rear direction. An outer cowl (21) is disposed forward of the left and right radiators (17, 17), and a rear inner cowl (31) is disposed rearward of the left and right radiators (17, 17). Traveling air passes through the left and right radiators (17, 17) from their inner sides to outer sides. The discharged air having passed through the left and right radiators (17, 17) passes between the outer cowl (21) and the rear inner cowl (31) and flows to the rear side of the vehicle.

In the case of the technique described in Patent Document 1, the rider's comfort may be impaired depending on the temperature of the discharged air having passed through the left and right radiators. For this reason, a technique that can enhance the rider's comfort is desired.

SUMMARY

It is preferable to provide a technique that can enhance the rider's comfort on a saddle-ride type vehicle in which radiators are disposed on the left and right sides of the vehicle body.

A first aspect of the present disclosure provides a saddle-ride type vehicle in which a radiator for cooling an engine is disposed on each of left and right sides of a vehicle body and oriented such that a longitudinal direction of the radiator extends along a vehicle front-rear direction, and a periphery of the radiator is covered by a cover member to cause traveling air flowing through an inner side of the vehicle body to pass through the radiator from its inner side to its outer side and thereby cool the radiator, the saddle-ride type vehicle comprising an air introduction path which is provided on an outer side of the vehicle body relative to the cover member and through which part of traveling air flowing along the outer side of the vehicle body is guided to a discharged-air outlet area situated by the radiator.

According to a second aspect of the present disclosure, the air introduction path may be formed by the cover member and a cowl member disposed outward of the cover member in a vehicle width direction and forming an exterior surface of the vehicle, and the cowl member may extend toward an outer side of the radiator in the vehicle width direction from an inlet of the air introduction path situated at a front end of the cowl member.

According to a third aspect of the present disclosure, an air-introduction-path outlet portion as an outlet of the air introduction path may be provided in such a way as to face and cover a cooling fan provided on an outer side surface of the radiator, and the cowl member may include a bent portion at a rear end portion thereof, the bent portion being a portion through which discharged air discharged from the cooling fan is guided into the air introduction path.

According to a fourth aspect of the present disclosure, a protruding portion may be formed rearward of the cowl member, the protruding portion protruding outward in the vehicle width direction to cover a front side of a leg of a rider, and an upper section and a lower section of the cowl member may extend to the protruding portion such that the air-introduction-path outlet portion is formed between the protruding portion and the cowl member.

According to a fifth aspect of the present disclosure, a radiator opening through which discharged air coming out of the radiator is discharged to outside may be formed in the cowl member, and a mesh cover member which blocks a foreign matter from outside may be provided in the radiator opening.

According to a sixth aspect of the present disclosure, a radiator opening through which discharged air coming out of the radiator is discharged to outside may be formed in the cowl member, and a louver member which adjusts flow of the discharged air may be provided in the radiator opening.

According to the first aspect of the present disclosure, in the saddle-ride type vehicle in which each radiator is disposed and oriented such that the longitudinal direction of the radiator extends along the vehicle front-rear direction, the periphery of the radiator is covered by the cover member. Traveling air flows through the radiator from the inner side to the outer side, thereby cooling the radiator. The traveling air coming out of the radiator is mixed at the discharged-air outlet area by the radiator with different traveling air flowing through the air introduction path. In this way, the temperature of the traveling air coming out of the radiator can be lowered.

Lowering the temperature of the discharged air can reduce the influence of the discharged air discharged from the radiator on the rider sitting rearward of the radiator as compared to a case without the air introduction path on the outer side of the cover member. Consequently, the comfort of the rider with the discharged air from the radiator can be enhanced.

According to the second aspect of the present disclosure, the air introduction path is formed by the cover member and the cowl member, which forms an exterior surface of the vehicle, and extends toward the outer side of the radiator in the vehicle width direction from the inlet situated at the front end of the cowl member. Since the air introduction path is formed by extending the cowl member, the structure of the air introduction path can be simplified while the influence of the discharged air discharged from the radiator on the rider can also be reduced to a low degree.

According to the third aspect of the present disclosure, the air-introduction-path outlet portion as the outlet of the air introduction path is provided in such a way as to face and cover the cooling fan, which is provided on the outer side surface of the radiator. Also, the air-introduction-path outlet portion includes the bent portion. Since the air-introduction-path outlet portion and the cooling fan are disposed to face each other, the traveling air coming out of the air-introduction-path outlet portion and the discharged air coming out of the cooling fan on the radiator are well mixed with each other. Consequently, the temperature of the discharged air can be further lowered.

Also, the cooling fan is provided on the outer side surface of the radiator, thereby providing a large traveling air path inward of the radiator. With the large traveling air path provided, the traveling air can be efficiently introduced into the radiator during travel of the vehicle. Thus, the cooling function of the radiator can be enhanced.

When the cooling fan is operated while the vehicle is stopped, part of the discharged air coming out of the radiator is likely to be guided into the air introduction path by the bent portion. The part of the discharged air is then guided to the front side of the vehicle from the air introduction path. Thus, the influence of the discharged air on the rider can be alleviated.

According to the fourth aspect of the present disclosure, the protruding portion, which protrudes outward in the vehicle width direction to cover the front side of the leg of the rider, is formed rearward of the cowl member. Also, the air-introduction-path outlet portion is formed between the protruding portion and the cowl member. The traveling air coming out of the air-introduction-path outlet portion comes into less contact with the leg of the rider when being guided by the protruding portion and flowing toward an obliquely rear side of the vehicle. The heat of the traveling air and of the discharged air coming out of the radiator is transferred less to the rider.

According to the fifth aspect of the present disclosure, the mesh cover member, which blocks a foreign matter from the outside, is provided in the radiator opening, through which the discharged air coming out of the radiator is discharged to the outside. Thus, the cover member can prevent entrance of a foreign matter into the cooling fan and therefore protect the cooling fan.

According to the sixth aspect of the present disclosure, the louver member is provided in the radiator opening, through which the discharged air coming out of the radiator is discharged to the outside. The traveling air coming out of the air introduction path and the discharged air coming out of the radiator are mixed with each other at the discharged-air outlet area. When the discharged air thus cooled is discharged through the radiator opening, the louver member allows for better adjustment of the flow of the discharged air coming out through the radiator opening. Also, providing the louver member in the radiator opening can prevent entrance of a foreign matter into the cooling fan and therefore protect the cooling fan. In addition, the exterior appearance of the radiator opening can be improved.

BRIEF DESCRIPTION OF THE DRAWINGS

FIG. 5 is a view describing the operation of the saddle-ride type vehicle during travel of the vehicle; and FIG. 6 is a view of another embodiment of FIG. 2.

DETAILED DESCRIPTION

Figure 1:
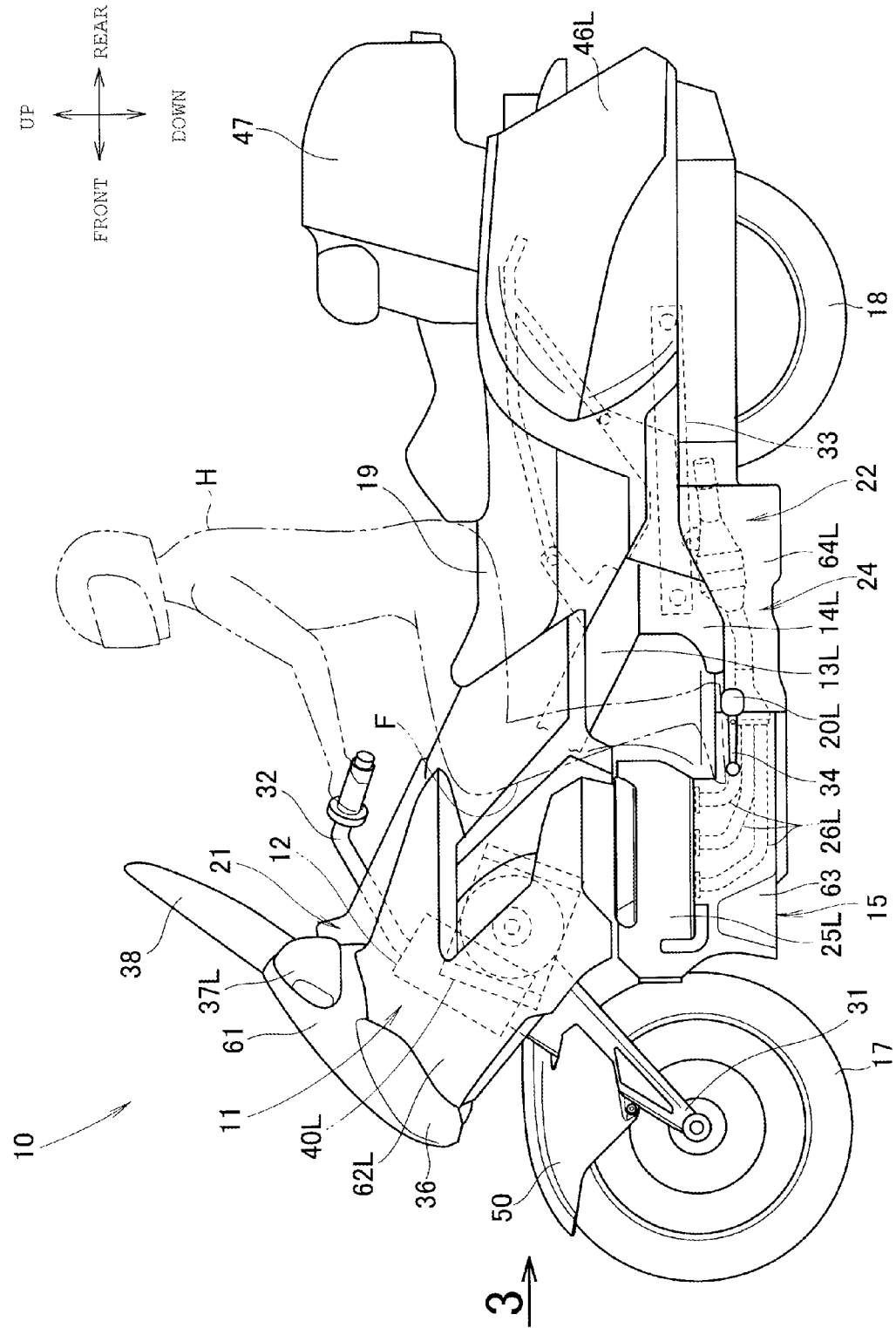
FIG. 1 is a left-side view of a motorcycle according to one embodiment of the present disclosure.

Embodiments of the present disclosure will be described below in detail. In the drawings and the embodiments, "upper," "lower," "front," "rear," "left," and "right" represent directions seen from a driver riding a motorcycle.

Embodiment

Embodiments of the present disclosure will be described based on the drawings.

As shown in FIG. 1, a motorcycle 10 is a saddle-ride type vehicle with a vehicle body frame 11 including: main frames 13L, 13R (only the one with reference numeral 13L on the near side in the figure is shown) extending from a head pipe 12 to the rear side of the vehicle; pivot frames 14L, 14R (only the one with reference numeral 14L on the near side in the figure is shown) extending downward from the main frames 13L, 13R, respectively; an engine 15 suspended on the vehicle body frame 11; a front-wheel steering section 21 including a front wheel 17 and provided steerably on the head pipe 12; a rear-wheel suspending section 22 including a rear wheel 18 and swingably supported on the pivot frames 14L, 14R; a seat 19 provided on the vehicle body frame 11 between the front wheel 17 and the rear wheel 18 for a rider to straddle to ride the saddle-ride type vehicle.

Rider steps 20L, 20R (only the one with reference numeral 20L on the near side in the figure is shown) on which the rider H (driver) can place his or her feet are provided on the vehicle body frame 11. A transmission unit is housed in a lower section of the engine 15 forward of the rider step 20L, and a shift lever 34 for gear shift is attached to the transmission unit. An exhaust device 24 is coupled to the engine 15. This exhaust device 24 includes two sets of three exhaust pipes 26L, 26R (only the ones with reference numeral 26L on the near side in the figure are shown) extending downward from cylinder sections 25L, 25R (only the one with reference numeral 25L on the near side in the figure is shown) of the engine 15, respectively, and then extending rearward.

The front-wheel steering section 21, which is steerably provided on the vehicle body frame 11, includes, as its main components, a front fork 31 provided turnably on the head pipe 12, the front wheel 17 rotatably mounted on the lower end of this front fork 31, and a steering handlebar 32 mounted on the upper end of the front fork 31. The rear-wheel suspending section 22 includes a swingarm 33 extending from the pivot frames 14 to the rear side of the vehicle and the rear wheel 18 rotatably mounted on a rear end portion of this swingarm 33.

The engine 15 is an water-cooled four-cycle six-piston horizontally-opposed engine with a crankshaft extending in the longitudinal direction of the vehicle. Left and right radiators 40L, 40R (only the one with reference numeral 40L on the near side in the figure is shown) which cool this engine 15 are disposed to the sides of and above the engine 15. The left and right radiators 40L, 40R are side radiators disposed with their longitudinal directions in parallel to the longitudinal direction of the vehicle and are supported on the main frames 13L, 13R, respectively.

Left and right trunks 46L, 46R (only the one with reference numeral 46L on the near side in the figure is shown) in which to store articles are provided at the rear section of the vehicle to the sides of the rear wheel 18. A rear trunk 47 is provided above these left and right trunks 46L, 46R. A front fender 50 for avoiding mud thrown up by the front wheel 17 is provided on the front fork 31.

Cowl members covering the vehicle body include: a front cowl 61; left and right front side cowls 62L, 62R (only the one with reference numeral 62L on the near side in the figure is shown) extending from the front cowl 61 toward the rear side of the vehicle to a space above the engine 15; an under cowl 63 covering the lower side of the engine 15 and the exhaust device 24; and left and right exhaust cowls 64L, 64R (only the one with reference numeral 64L on the near side in the figure is shown) provided to continue from the rear side of the under cowl 63 and cover the exhaust device 24.

Figure 2:
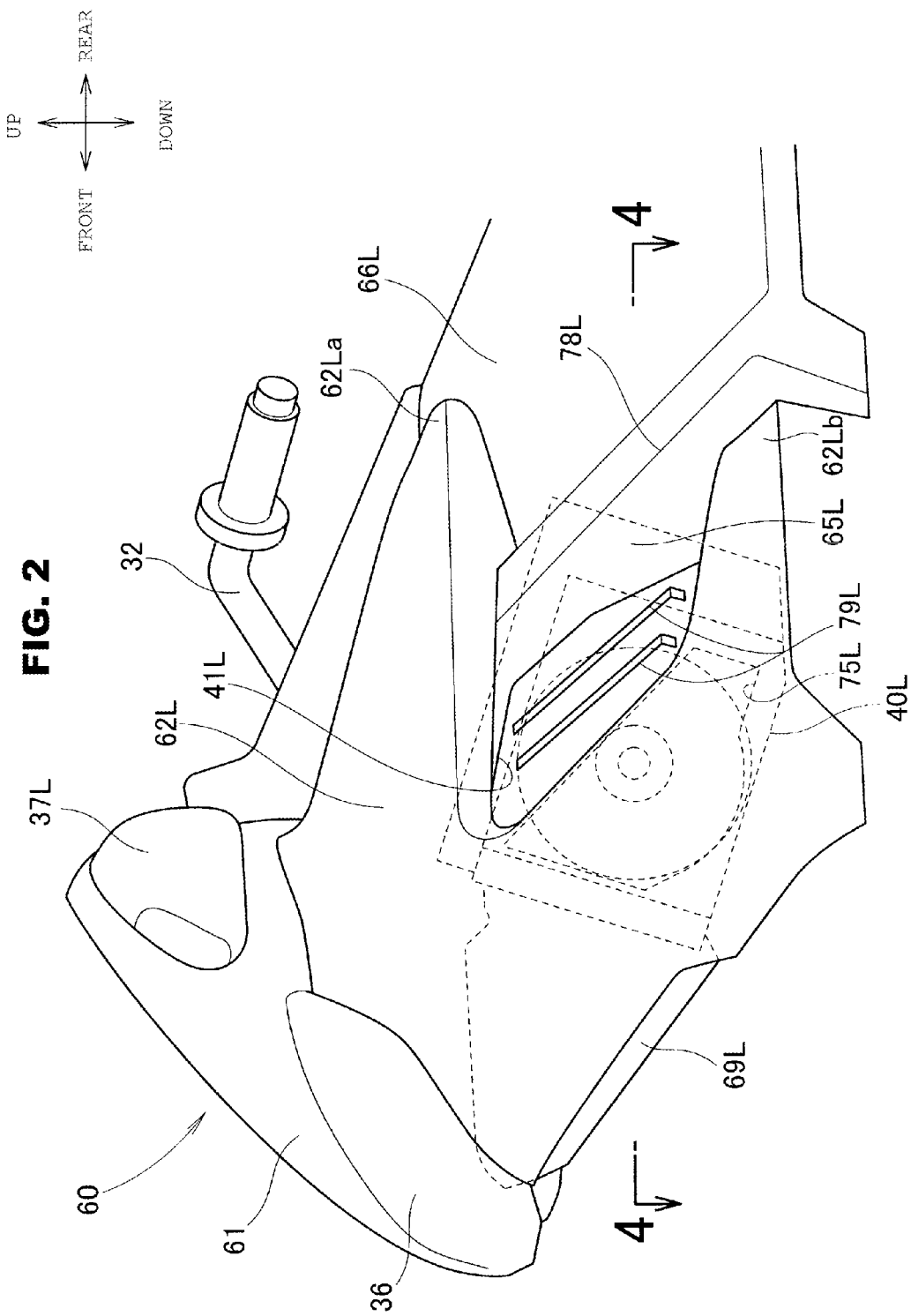
FIG. 2 is an enlarged view of a main section in FIG. 1.

As shown in FIG. 2, these cowl members 60 further include: middle side cowls 65L, 65R (only the one with reference numeral 65L on the near side in the figure is shown) as different cowl members provided on the rear side of the vehicle relative to the left and right front side cowls 62L, 62R (only the one with reference numeral 62L on the near side in the figure is shown) and covering the rear portion at the rear of radiator openings 41L, 41R (only the one with reference numeral 41L on the near side in the figure is shown); and middle upper cowls 66L, 66R (only the one with reference numeral 66L on the near side in the figure is shown) continuing from these middle side cowls 65L, 65R and covering the middle side cowls 65L, 65R from above.

The radiator openings 41L, 41R, through which discharge air (discharged air) having passed through the left and right radiators 40L, 40R (only the one with reference numeral 40L on the near side in the figure is shown) is discharged, are formed between the left and right front side cowls 62L, 62R and the left and right middle side cowls 65L, 65R, respectively. In the radiator openings 41L, 41R, through which the discharged air coming out of the radiators 40L, 40R is discharged, louver members 79L, 79R (only the one with reference numeral 79L on the near side in the figure is shown) are provided, respectively, which adjust the flow of the discharged air coming out of the left and right radiators 40L, 40R.

Figure 3:
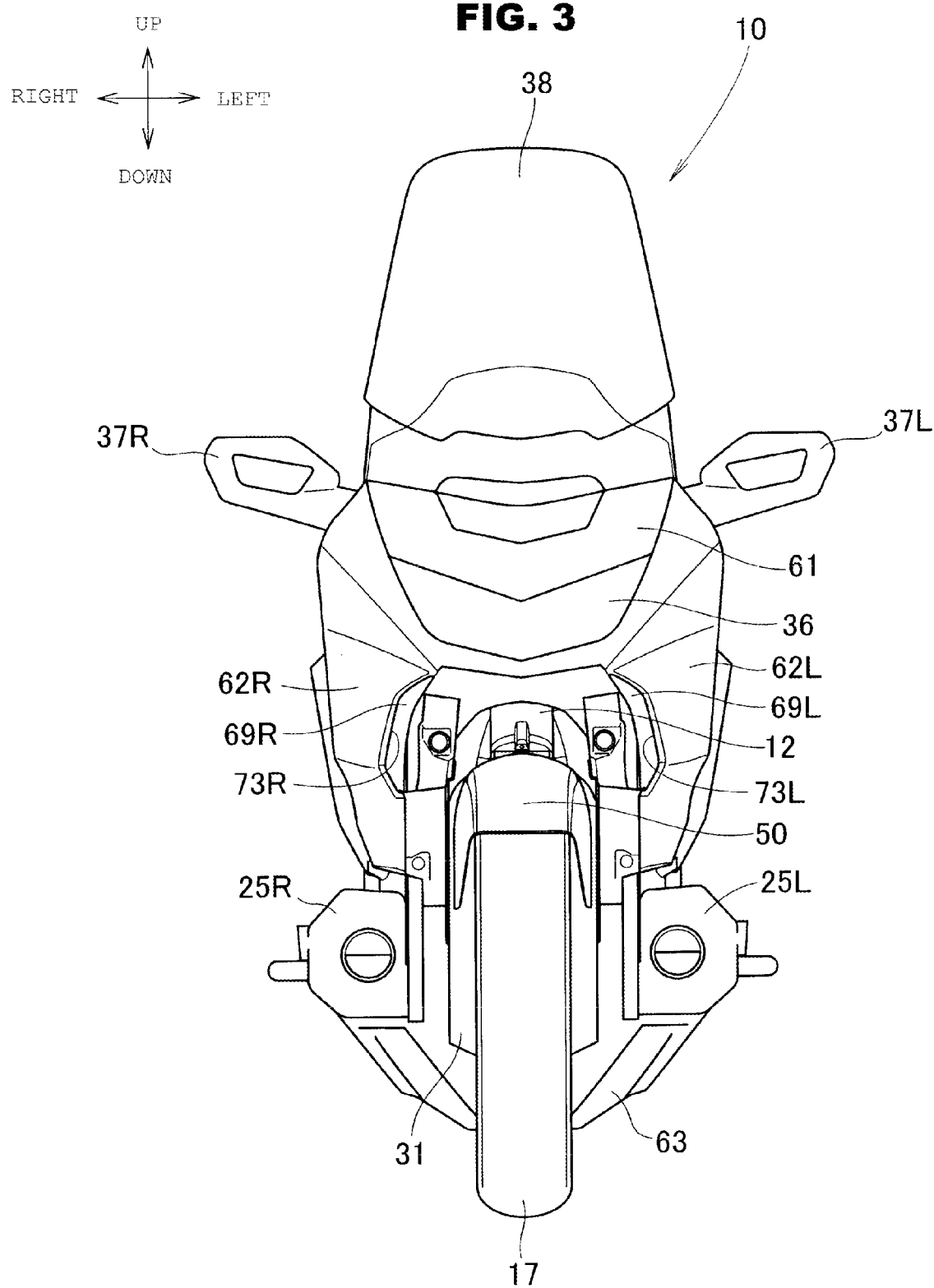
FIG. 3 is a view seen in the direction of arrow 3 in FIG. 1.

As shown in FIG. 3, in a view of the vehicle from the front side, a headlamp 36 is provided at the center in the vehicle width direction under the front cowl 61, and left and right rear-view mirrors 37L, 37R for visually checking the rear side extend from the front cowl 61 outwardly in the vehicle width direction toward the left and right sides. A glass windshield 38 for wind protection extends upward from the front cowl 61.

Next, the structures of the radiators and the surroundings of the radiators will be described in detail.

Figure 4:
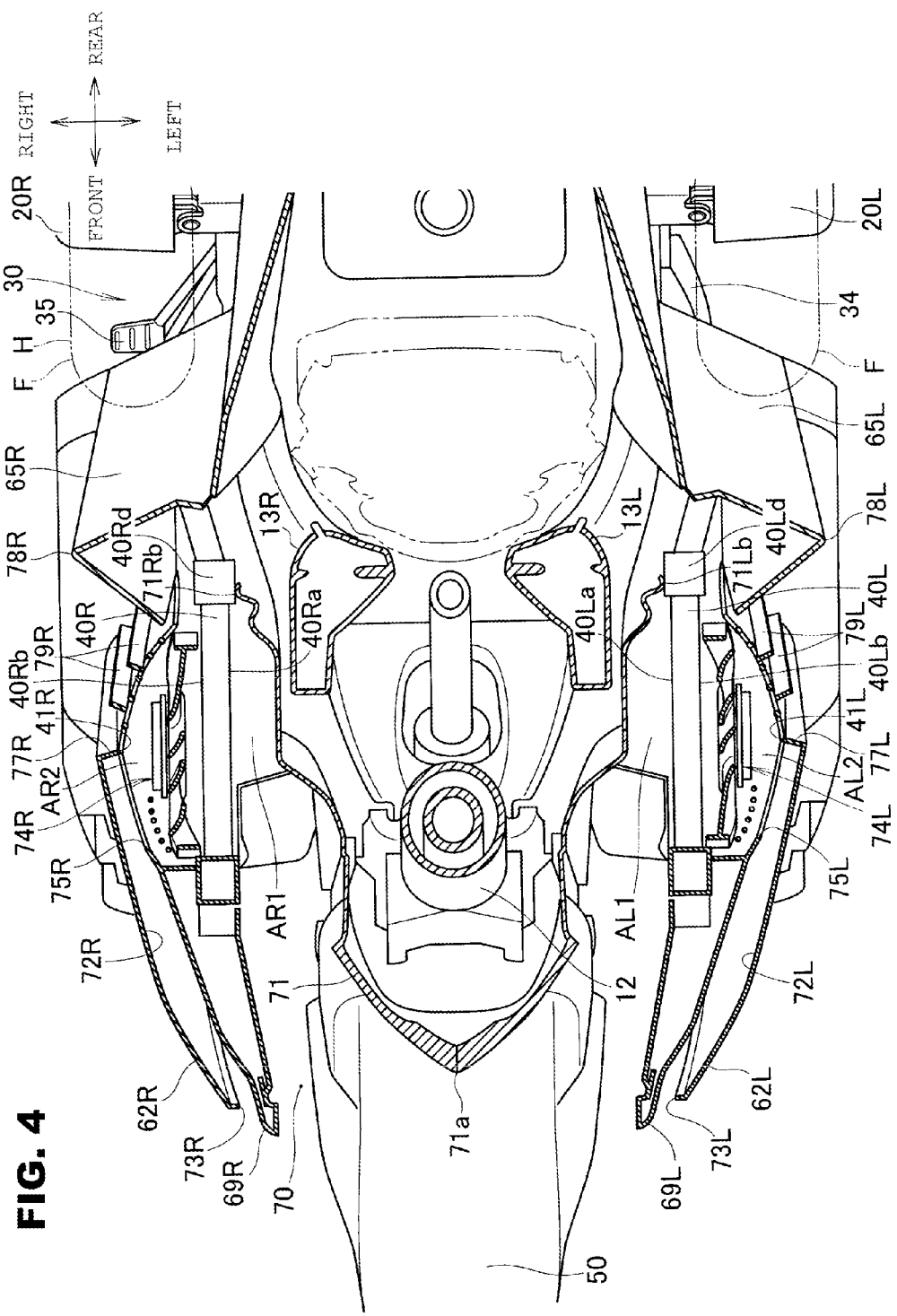
FIG. 4 is a cross-sectional view taken along line 4-4 in FIG. 2.

As shown in FIG. 4, the left and right radiators 40L, 40R for cooling the engine are disposed on the sides of a vehicle body 30 and oriented such that the longitudinal directions of the radiators 40L, 40R extend along the vehicle front-rear direction. The peripheries of these radiators 40L, 40R are covered by cover members 69L, 69R extending substantially in the vehicle front-rear direction. These cover members 69L, 69R define the inner side in the vehicle width direction and the outer side in the vehicle width direction relative to the radiators 40L, 40R.

The peripheries of air receiving surfaces 40La, 40Ra of the left and right radiators 40L, 40R are surrounded by the left and right cover members 69L, 69R. These air receiving surfaces 40La, 40Ra are disposed to face spaces AL1, AR1 on the inner side in the vehicle width direction communicating with an air introduction port 70 on the front side of the vehicle, whereas air discharge surfaces 40Lb, 40Rb are disposed to face the outer side in the vehicle width direction. A brake pedal 35 on which the rider can perform brake operation is provided near the right rider step 20R.

A front center cover 71 is provided inward of the left and right radiators 40L, 40R in the vehicle width direction, the front center cover 71 covering the outer sides of the head pipe 12 and the main frames 13L, 13R. The air introduction port 70, which introduces traveling air into the left and right radiators 40L, 40R, is formed between the front center cover 71 and the cover members 69L, 69R. The front center cover 71, which is provided inward of the left and right radiators 40L, 40R and guides the traveling air, includes a pointy portion 71a at its front end portion and extends from this pointy portion 71a toward the rear side of the vehicle. Rear end portions 71Lb, 71Rb of the front center cover 71 are in contact with rear ends 40Ld, 40Rd of the left and right radiators 40L, 40R, respectively.

The traveling air having entered the air introduction port 70 is split in the vehicle width direction into a left flow of air and a right flow of air by the pointy portion 71a, which is provided at the center in the vehicle width direction, passes through the spaces AL1, AR1 while being guided by the front center cover 71 and the cover members 69L, 69R, and is then introduced onto the air receiving surfaces 40La, 40Ra of the left and right radiators 40L, 40R.

Left and right air introduction paths 72L, 72R are provided on the outer sides of the cover members 69L, 69R, the left and right air introduction paths 72L, 72R being paths through which traveling air different from the traveling air entering the air introduction port 70 is guided to the outer sides of the left and right radiators 40L, 40R. These left and right air introduction paths 72L, 72R are formed by the left and right cover members 69L, 69R and the left and right front side cowls 62L, 62R, which are disposed outward of the left and right cover members 69L, 69R in the vehicle with direction and form exterior surfaces of the vehicle, respectively.

The cowl members (left and right front side cowls 62L, 62R) extend toward the outer sides of the left and right radiators 40L, 40R in the vehicle width direction from inlets 73L, 73R of the left and right air introduction paths 72L, 72R situated at the front ends of the left and right front side cowls 62L, 62R, respectively.

Cooling fans 74L, 74R are provided on the outer side surfaces of the left and right radiators 40L, 40R, and air-introduction-path outlet portions 75L, 75R of the air introduction paths 72L, 72R are provided in such a way as to cover the cooling fans 74L, 74R, respectively.

The left and right front side cowls 62L, 62R include bent portions 77L, 77R at their rear end portions, the bent portions 77L, 77R extending in such a way as to be bent inward in the vehicle width direction and guide the discharged air discharged from the cooling fans 74L, 74R into the air introduction paths 72L, 72R, respectively.

The different cowl members (left and right middle side cowls 65L, 65R) are provided rearward of the cowl members (left and right front side cowls 62L, 62R), the different cowl members including protruding portions 78L, 78R protruding outward in the vehicle width direction to cover the front sides of legs F of the rider.

Referring also to FIG. 2, upper sections 62La, 62Ra and lower sections 62Lb, 62Rb of the left and right front side cowls 62L, 62R extend to the protruding portions 78L, 78R such that the air-introduction-path outlet portions 75L, 75R are formed between the protruding portions 78L, 78R and the left and right front side cowls 62L, 62R, respectively.

The different cowl members (left and right middle side cowls 65L, 65R), which include the protruding portions 78L, 78R protruding outward in the vehicle width direction to cover the front sides of the legs F, F of the rider, are provided rearward of the cowl members (left and right front side cowls 62L, 62R), and the upper sections 62La, 62Ra and the lower sections 62Lb, 62Rb of the left and right front side cowls 62L, 62R extend to the protruding portions 78L, 78R such that the air-introduction-path outlet portions 75L, 75R are formed between the protruding portions 78L, 78R and the left and right front side cowls 62L, 62R.

Next, the operation of the above-described saddle-ride type vehicle will be described.

As shown in FIG. 5, traveling air entering the spaces inward of the cover members 69L, 69R in the vehicle width direction from the front side of the vehicle during travel of the vehicle flows from the inner sides of (or the spaces inward of) the left and right radiators 40L, 40R to the outer sides of (or the spaces outward of) the left and right radiators 40L, 40R, thereby cooling the left and right radiators 40L, 40R.

The cooling fans 74L, 74R are provided on the outer side surfaces of the left and right radiators 40L, 40R. Assume now that the cooling fans 74L, 74R are provided on the inner side surfaces of the left and right radiators 40L, 40R. This means that these cooling fans 74L, 74R are disposed between the left and right radiators 40L, 40R and the front center cover 71, which is situated inward of the left and right radiators 40L, 40R. In this case, the volumes of the traveling air paths formed inward of the left and right radiators 40L, 40R decrease by the volumes of the spaces where the left and right cooling fans 74L, 74R are disposed.

In this respect, in the present disclosure, the cooling fans 74L, 74R are provided in the outer side surfaces of the left and right radiators 40L, 40R, thereby providing large traveling air paths (spaces AL1, AR1) inward of the left and right radiators 40L, 40R. With the large spaces AL1, AR1 provided, the traveling air can be efficiently introduced into the left and right radiators 40L, 40R during travel of the vehicle. Consequently, the cooling function of the left and right radiators 40L, 40R can be enhanced.

Moreover, the traveling air having entered the spaces between the cover members 69L, 69R and the left and right front side cowls 62L, 62R from the front side of the vehicle passes through the air introduction paths 72L, 72R. After passing through the air-introduction-path outlet portions 75L, 75R of the air introduction paths 72L, 72R, which are provided in such a way as to cover the cooling fans 74L, 74R disposed on the outer side surfaces of the left and right radiators 40L, 40R, the traveling air is mixed with the discharged air having passed through the left and right radiators 40L, 40R at discharged-air outlet areas AL2, AR2 which are spaces situated between the air-introduction-path outlet portions 75L, 75R and the left and right radiators 40L, 40R, and is then discharged to the outside through the radiator openings 41L, 41R.

In sum, the traveling air (discharged air) coming out of the left and right radiators 40L, 40R is mixed by the outer sides of the left and right radiators 40L, 40R with the different traveling air having flowed through the air introduction paths 72L, 72R. Hence, the temperature of the traveling air (discharged air) coming out of the left and right radiators 40L, 40R can be lowered.

Further, since the left and right front side cowls 62L, 62R include, at their rear end portions, the bent portions 77L, 77R, which guide the discharged air discharged from the cooling fans 74L, 74R into the air introduction paths, the discharged air discharged from the air discharge surfaces 40Lb, 40Rb of the left and right radiators 40L, 40R and the traveling air having flowed through the air introduction paths 72L, 72R can be well mixed with each other at the spaces AL2, AR2, which are situated between the air-introduction-path outlet portions 75L, 75R and the left and right radiators 40L, 40R. Hence, the temperature of the discharged air can be effectively lowered.

Lowering the temperature of the discharged air can reduce the influence of the discharged air discharged from the left and right radiators 40L, 40R on the rider H (see FIG. 1) sitting rearward of the left and right radiators 40L, 40R as compared to a case without the air introduction paths on the outer sides of the cover members. Consequently, the comfort of the rider H with heat can be enhanced.

The air introduction paths 72L, 72R are formed by the cover members 69L, 69R and the cowl members (left and right front side cowls 62L, 62R), which form exterior surfaces of the vehicle. Also, the air introduction paths 72L, 72R extend toward the region located on the outer sides of the left and right radiators 40L, 40R in the vehicle width direction from the inlets 73L, 73R of the air introduction paths 72L, 72R, which are formed between the left and right front side cowls 62L, 62R and the left and right cover members 69L, 69R and situated at the front ends of the left and right front side cowls 62L, 62R, respectively.

Since the air introduction paths 72L, 72R are formed by extending the left and right front side cowls 62L, 62R toward the rear side of the vehicle, the structure of the air introduction paths 72L, 72R can be simplified while the influence of the discharged air discharged from the left and right radiators 40L, 40R on the rider H can also be reduced to a lower degree.

The left and right middle side cowls 65L, 65R, which include the protruding portions 78L, 78R, are provided rearward of the left and right front side cowls 62L, 62R. Thus, the heat of the traveling air and of the discharged air coming out of the radiators is transferred less to the rider H. Also, the air-introduction-path outlet portions 75L, 75R are formed between the left and right front side cowls 62L, 62R and the left and right middle side cowls 65L, 65R, which include the protruding portions 78L, 78R, respectively. The traveling air coming out of the air-introduction-path outlet portions 75L, 75R is mixed with the discharged air coming out of the left and right radiators 40L, 40R and then guided by the protruding portions 78L, 78R toward obliquely rear sides of the vehicle. Thus, the influence of the discharged air coming out of the left and right radiators 40L, 40R on the rider H can be reduced.

The air-introduction-path outlet portions 75L, 75R are provided in such a way as to cover the cooling fans 74L, 74R and the bent portions 77L, 77R are formed at the rear ends of these air-introduction-path outlet portions 75L, 75R.

When the cooling fans 40L, 40R are operated while the vehicle is stopped, the discharged air from the left and right radiators 40L, 40R are discharged outward in the vehicle width direction through the radiator openings 41L, 41R.

At the same time, part of the discharged air from the left and right radiators 40L, 40R is likely to be guided into the air introduction paths 72L, 72R by the air-introduction-path outlet portions 75L, 75R and the bent portions 77L, 77R, which are provided in such a way as to cover the cooling fans 74L, 74R, and then guided to the front side of the vehicle along the air introduction paths 72L, 72R. In other words, in addition to the radiator openings 41L, 41R, the air-introduction-path outlet portions 75L, 75R are arranged as outlets for the discharged air coming out of the cooling fans 74L, 74R. Since a plurality of flow paths are provided for the discharged air, the influence of the discharged air on the rider can be alleviated.

Also, since the louver members 79L, 79R are provided in the radiator openings 41L, 41R, through which the discharged air coming out of the radiators 40L, 40R is discharged to the outside, the louver members 79L, 79R allow for better adjustment of the flow of the discharged air. Further, the louver members 79L, 79R can prevent entrance of foreign matters into the cooling fans 74L, 74R and therefore protect the cooling fans 74L, 74R. In addition, the louver members 79L, 79R can improve the exterior appearance of the radiator openings 41L, 41R and the surroundings of the radiator openings 41L, 41R.

Next, another embodiment of the radiator openings formed in the cowl members forming the side sections of the vehicle body will be described.

As shown in FIG. 6, the radiator openings 41L, 41R, through which air (discharged air) having passed through the left and right radiators 40L, 40R (only the one with reference numeral 40L on the near side in the figure is shown) is discharged, are formed between the left and right front side cowls 62L, 62R and the left and right middle side cowls 65L, 65R, respectively. Mesh cover members 89L, 89R (only the one with reference numeral 89L on the near side in the figure is shown) which block foreign matters from the outside are provided in the radiator openings 41L, 41R, respectively, through which the discharged air coming out of the radiators 40L, 40R is discharged to the outside. The difference from the above embodiment is that the mesh cover members are provided in the radiator openings 41L, 41R in place of the louver members. The other features are not greatly different and description thereof is omitted.

Since the mesh cover members 89L, 89R, which block foreign matters from the outside, are provided in the radiator openings 41L, 41R, the mesh cover members 89L, 89R can operate in such a way as to prevent entrance of foreign matters into the cooling fans 74L, 74R (see FIG. 4) and therefore protect the cooling fans 74L, 74R.

Note that the present disclosure is applied to a motorcycle in the embodiments but is also applicable to three-wheeled vehicles and may be applied to general vehicles. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The present disclosure is preferable for motorcycles including radiators at side sections of the vehicle.

The invention claimed is:

1. A saddle-ride type vehicle comprising:
a radiator for cooling an engine disposed on each of left and right sides of a vehicle body such that a longitudinal direction of the radiator extends along a vehicle front-rear direction;
a cover member covering a periphery of the radiator to cause traveling air flowing through an inner side of the vehicle body to pass through the radiator from the inner side of the vehicle body to an outer side of the vehicle body to cool the radiator; and
an air introduction path which is provided on an outer side of the vehicle body relative to the cover member and through which part of traveling air flowing along the outer side of the vehicle body is guided to a discharged-air outlet area of the radiator,
wherein the air introduction path is defined by the cover member and a cowl member disposed outward of the cover member in a vehicle width direction and forming an exterior surface of the vehicle, and
the cowl member extends toward an outer side of the radiator in the vehicle width direction from an inlet of the air introduction path situated at a front end of the cowl member.

2. The saddle-ride type vehicle according to claim 1, wherein the air introduction path includes an air-introduction-path outlet portion as an outlet thereof, the air introduction-path outlet portion being provided in such a way as to face and cover a cooling fan provided on an outer side surface of the radiator, and
the cowl member includes a bent portion at a rear end portion thereof, the bent portion guiding discharged air discharged from the cooling fan into the air introduction path.

3. The saddle-ride type vehicle according to claim 2, further comprising a protruding portion disposed rearward of the cowl member, the protruding portion protruding outward in the vehicle width direction to cover a front side of a leg of a rider, and
wherein an upper section and a lower section of the cowl member extend to the protruding portion such that the air-introduction-path outlet portion is disposed between the protruding portion and the cowl member.

4. The saddle-ride type vehicle according to claim 1, wherein the cowl member includes a radiator opening through which discharged air coming out of the radiator is discharged to outside, and
a mesh cover member which blocks a foreign matter from outside is provided in the radiator opening.

5. The saddle-ride type vehicle according to claim 1, wherein the cowl member includes a radiator opening through which discharged air coming out of the radiator is discharged to outside, and
a louver member which adjusts flow of the discharged air is provided in the radiator opening.

6. The saddle-ride type vehicle according to claim 1, wherein the cover member is disposed forward of the radiator to direct the traveling air to an inner side of the cover member in a vehicle width direction and direct the traveling air to the air introduction path.

7. The saddle-ride type vehicle according to claim 1, wherein the cowl member extends along the cover member to define the air introduction path between the cowl member and the cover member,
the saddle-ride type vehicle further comprises a chamber disposed outside the radiator in the vehicle width direction, the chamber being the discharged-air outlet area, and
the air introduction path is connected to the chamber.

8. The saddle-ride type vehicle according to claim 1, further comprising a front center cover disposed inward of the cover member in a vehicle width direction, and an inner air introduction path disposed between the front center cover and the cover member, wherein the inner air introduction path is connected to an inner surface of the radiator.

9. The saddle-ride type vehicle according to claim 2, wherein the bent portion is bent from the rear end portion of the cowl member inward with respect to the vehicle width direction.

10. A saddle-ride type vehicle comprising:
a radiator for cooling an engine disposed on each of left and right sides of a vehicle body such that a longitudinal direction of the radiator extends along a vehicle front-rear direction;
a cover member covering a periphery of the radiator to cause traveling air flowing through an inner side of the vehicle body to pass through the radiator from the inner side of the vehicle body to an outer side of the vehicle body to cool the radiator; and
an air introduction path which is provided on an outer side of the vehicle body relative to the cover member and through which part of traveling air flowing along the outer side of the vehicle body is guided to a discharged-air outlet area of the radiator, wherein the air introduction path is defined by the cover member and a second cover member disposed outward of the cover member in a vehicle width direction, and the second cover member extends along the vehicle front-rear direction toward an outer side of the radiator in the vehicle width direction from a front portion of the second cover member.

* * * * *